(12) United States Patent
Nguyen et al.

(10) Patent No.: US 12,703,977 B2
(45) Date of Patent: Aug. 11, 2026

(54) METAL ROOFING SHINGLES

(71) Applicant: GAF Energy LLC, Parsippany, NJ (US)

(72) Inventors: Thierry Nguyen, San Francisco, CA (US); Michael David Kuiper, Newark, CA (US); Gary Rossi, San Francisco, CA (US); Gabriela Bunea, San Jose, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 19/209,617

(22) Filed: May 15, 2025

(65) Prior Publication Data

US 2025/0354379 A1 Nov. 20, 2025

Related U.S. Application Data

(60) Provisional application No. 63/648,986, filed on May 17, 2024.

(51) Int. Cl.
*E04D 1/28* (2006.01)
*E04D 1/00* (2006.01)
(Continued)

(52) U.S. Cl.
CPC ................. *E04D 1/28* (2013.01); *E04D 1/18* (2013.01); *E04D 1/2918* (2019.08); *E04D 1/2942* (2019.08); *H02S 20/25* (2014.12)

(58) Field of Classification Search
CPC ................ E04D 1/18; E04D 1/28; E04D 3/30
See application file for complete search history.

(56) References Cited

U.S. PATENT DOCUMENTS 1,981,467 A 11/1934 Radtke
3,156,497 A 11/1964 Lessard
(Continued)

FOREIGN PATENT DOCUMENTS

CA 2829440 A 5/2019
CH 700095 A2 6/2010
(Continued)

OTHER PUBLICATIONS

Sunflare, Products: "Sunflare Develops Prototype For New Residential Solar Shingles"; 2019 <<sunflaresolar.com/news/sunflare-develops-prototype-for-new-residential-solar-shingles>> retrieved Feb. 2, 2021.

(Continued)

*Primary Examiner* — Adriana Figueroa
(74) *Attorney, Agent, or Firm* — GREENBERG TRAURIG, LLP

(57) ABSTRACT

A roofing system including a plurality of photovoltaic modules installed on a roof deck, where each of the photovoltaic modules includes at least one solar cell, and a plurality of metal roofing shingles installed on the roof deck adjacent the plurality of photovoltaic modules, where the plurality of metal roofing shingles includes at least a first metal roofing shingle and a second metal roofing shingle, where each of the metal roofing shingles includes a first layer that includes a metal material, and a second layer that includes a polymer material, where the second layer includes a nail zone with a plurality of fasteners extending therethrough, fastening the metal roofing shingle to the roof deck, where the second layer is between the roof deck and the first layer.

20 Claims, 8 Drawing Sheets

(51) Int. Cl.
*E04D 1/18* (2006.01)
*H02S 20/25* (2014.01)

(56) References Cited

U.S. PATENT DOCUMENTS 3,411,259 A * 11/1968 Anderson ................ E04D 3/40 52/14
3,581,779 A 6/1971 Gilbert, Jr.
4,258,948 A 3/1981 Hoffmann
4,349,220 A 9/1982 Carroll et al.
4,499,702 A 2/1985 Turner
4,636,577 A 1/1987 Peterpaul
5,167,579 A 12/1992 Rotter
5,437,735 A 8/1995 Younan et al.
5,495,654 A * 3/1996 Goodhart ............. E04D 1/2916 52/529
5,590,495 A 1/1997 Bressler et al.
5,642,596 A 7/1997 Waddington
5,657,603 A * 8/1997 Goodhart ............. E04D 1/2916 52/529
5,953,810 A * 9/1999 Goodhart ............. E04D 1/2916 52/518
6,008,450 A 12/1999 Ohtsuka et al.
6,033,270 A 3/2000 Stuart
6,046,399 A 4/2000 Kapner
6,201,180 B1 3/2001 Meyer et al.
6,220,329 B1 4/2001 King et al.
D449,897 S * 10/2001 Croft ........................... D25/139
6,308,482 B1 10/2001 Strait
6,320,114 B1 11/2001 Kuechler
6,320,115 B1 11/2001 Kataoka et al.
6,336,304 B1 1/2002 Mimura et al.
6,341,454 B1 1/2002 Koleoglou
6,407,329 B1 6/2002 Iino et al.
6,576,830 B2 6/2003 Nagao et al.
6,619,006 B1 * 9/2003 Shirota .................... E04D 1/18 52/447
6,928,781 B2 8/2005 Desbois et al.
6,972,367 B2 12/2005 Federspiel et al.
7,138,578 B2 11/2006 Komamine
7,155,870 B2 1/2007 Almy
7,178,295 B2 2/2007 Dinwoodie
7,487,771 B1 2/2009 Eiffert et al.
7,587,864 B2 9/2009 McCaskill et al.
7,678,990 B2 3/2010 McCaskill et al.
7,678,991 B2 3/2010 McCaskill et al.
7,748,191 B2 7/2010 Podirsky
7,819,114 B2 10/2010 Augenbraun et al.
7,824,191 B1 11/2010 Podirsky
7,832,176 B2 11/2010 McCaskill et al.
8,118,109 B1 2/2012 Hacker
8,168,880 B2 5/2012 Jacobs et al.
8,173,889 B2 5/2012 Kalkanoglu et al.
8,210,570 B1 7/2012 Railkar et al.
8,276,329 B2 10/2012 Lenox
8,312,693 B2 11/2012 Cappelli
8,319,093 B2 11/2012 Kalkanoglu et al.
8,323,778 B2 * 12/2012 Webb ..................... B32B 15/18 428/184
8,333,040 B2 12/2012 Shiao et al.
8,371,076 B2 2/2013 Jones et al.
8,375,653 B2 2/2013 Shiao et al.
8,404,967 B2 3/2013 Kalkanoglu et al.
8,410,349 B2 4/2013 Kalkanoglu et al.
8,418,415 B2 4/2013 Shiao et al.
8,438,796 B2 5/2013 Shiao et al.
8,468,754 B2 6/2013 Railkar et al.
8,468,757 B2 6/2013 Krause et al.
8,505,249 B2 8/2013 Geary
8,512,866 B2 8/2013 Taylor
8,513,517 B2 8/2013 Kalkanoglu et al.
8,586,856 B2 11/2013 Kalkanoglu et al.
8,601,754 B2 12/2013 Jenkins et al.
8,629,578 B2 1/2014 Kurs et al.
8,646,228 B2 2/2014 Jenkins
8,656,657 B2 2/2014 Livsey et al.
8,671,630 B2 3/2014 Lena et al.
8,677,702 B2 3/2014 Jenkins
8,695,289 B2 4/2014 Koch et al.
8,713,858 B1 5/2014 Xie
8,713,860 B2 5/2014 Railkar et al.
8,733,038 B2 5/2014 Kalkanoglu et al.
8,776,455 B2 7/2014 Azoulay
8,789,321 B2 7/2014 Ishida
8,793,940 B2 8/2014 Kalkanoglu et al.
8,793,941 B2 8/2014 Bosler et al.
8,826,607 B2 9/2014 Shiao et al.
8,835,751 B2 9/2014 Kalkanoglu et al.
8,863,451 B2 10/2014 Jenkins et al.
8,898,963 B1 * 12/2014 Amatruda ............ E04D 1/2963 52/409
8,898,970 B2 12/2014 Jenkins et al.
8,898,987 B1 * 12/2014 Amatruda ................ E04D 1/28 52/557
8,925,262 B2 1/2015 Railkar et al.
8,925,272 B1 * 1/2015 Amatruda ............ E04D 1/2963 52/557
8,943,766 B2 2/2015 Gombarick et al.
8,946,544 B2 2/2015 Jabos et al.
8,950,128 B2 2/2015 Kalkanoglu et al.
8,959,848 B2 2/2015 Jenkins et al.
8,966,838 B2 3/2015 Jenkins
8,966,850 B2 3/2015 Jenkins et al.
8,994,224 B2 3/2015 Mehta et al.
9,032,672 B2 5/2015 Livsey et al.
9,121,178 B2 9/2015 Belt et al.
9,153,950 B2 10/2015 Yamanaka et al.
9,166,087 B2 10/2015 Chihlas et al.
9,169,646 B2 10/2015 Rodrigues et al.
9,170,034 B2 10/2015 Bosler et al.
9,178,465 B2 11/2015 Shiao et al.
9,202,955 B2 12/2015 Livsey et al.
9,212,832 B2 12/2015 Jenkins
9,217,584 B2 12/2015 Kalkanoglu et al.
9,270,221 B2 2/2016 Zhao
9,273,885 B2 3/2016 Rodrigues et al.
9,276,141 B2 3/2016 Kalkanoglu et al.
9,290,945 B2 * 3/2016 Beerer ...................... E04D 1/26
9,331,224 B2 5/2016 Koch et al.
9,356,174 B2 5/2016 Duarte et al.
9,359,014 B1 6/2016 Yang et al.
9,412,890 B1 8/2016 Meyers
9,528,270 B2 12/2016 Jenkins et al.
9,605,432 B1 3/2017 Robbins
9,711,672 B2 7/2017 Wang
9,755,573 B2 9/2017 Livsey et al.
9,786,802 B2 10/2017 Shiao et al.
9,831,818 B2 11/2017 West
9,912,284 B2 3/2018 Svec
9,923,515 B2 3/2018 Rodrigues et al.
9,938,729 B2 4/2018 Coon
9,966,898 B1 * 5/2018 Flanigan .................. E04D 1/12
9,991,412 B2 6/2018 Gonzalez et al.
9,998,067 B2 6/2018 Kalkanoglu et al.
10,027,273 B2 7/2018 West et al.
10,115,850 B2 10/2018 Rodrigues et al.
10,128,660 B1 11/2018 Apte et al.
10,156,075 B1 12/2018 McDonough
10,187,005 B2 1/2019 Rodrigues et al.
10,256,765 B2 4/2019 Rodrigues et al.
10,284,136 B1 5/2019 Mayfield et al.
10,454,408 B2 10/2019 Livsey et al.
10,530,292 B1 1/2020 Cropper et al.
10,560,048 B2 2/2020 Fisher et al.
10,563,406 B2 2/2020 Kalkanoglu et al.
D879,031 S 3/2020 Lance et al.
10,579,028 B1 3/2020 Jacob
10,784,813 B2 9/2020 Kalkanoglu et al.
D904,289 S 12/2020 Lance et al.
11,012,026 B2 5/2021 Kalkanoglu et al.
11,085,187 B2 8/2021 Grubka et al.
11,177,639 B1 11/2021 Nguyen et al.
11,217,715 B2 1/2022 Sharenko et al.
11,251,744 B1 2/2022 Bunea et al.

(56) References Cited

U.S. PATENT DOCUMENTS 11,258,399 B2 2/2022 Kalkanoglu et al.
11,283,394 B2 3/2022 Perkins et al.
11,309,828 B2 4/2022 Sirski et al.
11,394,344 B2 7/2022 Perkins et al.
11,424,379 B2 8/2022 Sharenko et al.
11,431,280 B2 8/2022 Liu et al.
11,431,281 B2 8/2022 Perkins et al.
11,444,569 B2 9/2022 Clemente et al.
11,454,027 B2 9/2022 Kuiper et al.
11,459,757 B2 10/2022 Nguyen et al.
11,486,144 B2 11/2022 Bunea et al.
11,489,482 B2 11/2022 Peterson et al.
11,496,088 B2 11/2022 Sirski et al.
11,508,861 B1 11/2022 Perkins et al.
11,512,480 B1 11/2022 Achor et al.
11,527,665 B2 12/2022 Boitnott
11,545,927 B2 1/2023 Abra et al.
11,545,928 B2 1/2023 Perkins et al.
11,566,426 B2 * 1/2023 Boss .................. E04D 13/0481
11,658,470 B2 5/2023 Nguyen et al.
11,661,745 B2 5/2023 Bunea et al.
11,689,149 B2 6/2023 Clemente et al.
11,705,531 B2 7/2023 Sharenko et al.
11,728,759 B2 8/2023 Nguyen et al.
11,732,490 B2 8/2023 Achor et al.
11,811,361 B1 11/2023 Farhangi et al.
11,824,486 B2 11/2023 Nguyen et al.
11,824,487 B2 11/2023 Nguyen et al.
11,843,067 B2 12/2023 Nguyen et al.
11,987,985 B2 * 5/2024 Wenstrup .................. E04D 3/35
12,209,414 B2 * 1/2025 Kavulak ............... E04D 1/2907
2002/0053360 A1 5/2002 Kinoshita et al.
2002/0129849 A1 9/2002 Heckeroth
2003/0101662 A1 6/2003 Ullman
2003/0132265 A1 7/2003 Villela et al.
2003/0217768 A1 11/2003 Guha
2004/0000334 A1 1/2004 Ressler
2005/0030187 A1 2/2005 Peress et al.
2005/0115603 A1 6/2005 Yoshida et al.
2005/0144870 A1 7/2005 Dinwoodie
2005/0178428 A1 8/2005 Laaly et al.
2005/0193673 A1 9/2005 Rodrigues et al.
2006/0042683 A1 3/2006 Gangemi
2006/0046084 A1 3/2006 Yang et al.
2007/0074757 A1 4/2007 Mellott et al.
2007/0181174 A1 8/2007 Ressler
2007/0193618 A1 8/2007 Bressler et al.
2007/0249194 A1 10/2007 Liao
2007/0295385 A1 12/2007 Sheats et al.
2008/0006323 A1 1/2008 Kalkanoglu et al.
2008/0035140 A1 2/2008 Placer et al.
2008/0078440 A1 4/2008 Lim et al.
2008/0185748 A1 8/2008 Kalkanoglu
2008/0271774 A1 11/2008 Kalkanoglu et al.
2008/0289682 A1 11/2008 Adriani et al.
2008/0302030 A1 12/2008 Stancel et al.
2008/0315061 A1 12/2008 Fath
2009/0000222 A1 1/2009 Kalkanoglu et al.
2009/0014057 A1 1/2009 Croft et al.
2009/0014058 A1 1/2009 Croft et al.
2009/0019795 A1 1/2009 Szacsvay et al.
2009/0044850 A1 2/2009 Kimberley
2009/0114261 A1 5/2009 Stancel et al.
2009/0133340 A1 5/2009 Shiao et al.
2009/0159118 A1 6/2009 Kalkanoglu et al.
2009/0178350 A1 7/2009 Kalkanoglu et al.
2009/0229652 A1 9/2009 Mapel et al.
2009/0275247 A1 11/2009 Richter et al.
2010/0019580 A1 1/2010 Croft et al.
2010/0095618 A1 4/2010 Edison et al.
2010/0101634 A1 4/2010 Frank et al.
2010/0116325 A1 5/2010 Nikoonahad
2010/0131108 A1 5/2010 Meyer
2010/0139184 A1 6/2010 Williams et al.
2010/0146878 A1 6/2010 Koch et al.
2010/0159221 A1 6/2010 Kourtakis et al.
2010/0170169 A1 7/2010 Railkar et al.
2010/0186798 A1 7/2010 Tormen et al.
2010/0242381 A1 9/2010 Jenkins
2010/0313499 A1 12/2010 Gangemi
2010/0325976 A1 12/2010 DeGenfelder et al.
2010/0326488 A1 12/2010 Aue et al.
2010/0326501 A1 12/2010 Zhao et al.
2011/0030761 A1 2/2011 Kalkanoglu et al.
2011/0036386 A1 2/2011 Browder
2011/0036389 A1 2/2011 Hardikar et al.
2011/0048507 A1 3/2011 Livsey et al.
2011/0058337 A1 3/2011 Han et al.
2011/0061326 A1 3/2011 Jenkins
2011/0100436 A1 5/2011 Cleereman et al.
2011/0104488 A1 5/2011 Muessig et al.
2011/0132427 A1 6/2011 Kalkanoglu et al.
2011/0168238 A1 7/2011 Metin et al.
2011/0239555 A1 10/2011 Cook et al.
2011/0302859 A1 12/2011 Crasnianski
2011/0314753 A1 12/2011 Farmer et al.
2012/0034799 A1 2/2012 Hunt
2012/0060434 A1 3/2012 Jacobs
2012/0060902 A1 3/2012 Drake
2012/0085392 A1 4/2012 Albert et al.
2012/0137600 A1 6/2012 Jenkins
2012/0176077 A1 7/2012 Oh et al.
2012/0212065 A1 8/2012 Cheng et al.
2012/0233940 A1 9/2012 Perkins et al.
2012/0240490 A1 9/2012 Gangemi
2012/0260977 A1 10/2012 Stancel
2012/0266942 A1 10/2012 Komatsu et al.
2012/0279150 A1 11/2012 Pislkak et al.
2012/0282437 A1 11/2012 Clark et al.
2012/0291848 A1 11/2012 Sherman et al.
2013/0008499 A1 1/2013 Verger et al.
2013/0014455 A1 1/2013 Grieco
2013/0118558 A1 5/2013 Sherman
2013/0193769 A1 8/2013 Mehta et al.
2013/0247988 A1 9/2013 Reese et al.
2013/0284267 A1 10/2013 Plug et al.
2013/0306137 A1 11/2013 Ko
2014/0090697 A1 4/2014 Rodrigues et al.
2014/0150843 A1 6/2014 Pearce et al.
2014/0173997 A1 6/2014 Jenkins
2014/0179220 A1 6/2014 Railkar et al.
2014/0182222 A1 7/2014 Kalkanoglu et al.
2014/0208675 A1 7/2014 Beerer et al.
2014/0254776 A1 9/2014 O'Connor et al.
2014/0266289 A1 9/2014 Della Sera et al.
2014/0272244 A1 9/2014 Harrington, Jr. et al.
2014/0311556 A1 10/2014 Feng et al.
2014/0352760 A1 12/2014 Haynes et al.
2014/0366464 A1 12/2014 Rodrigues et al.
2015/0089895 A1 4/2015 Leitch
2015/0162459 A1 6/2015 Lu et al.
2015/0340516 A1 11/2015 Kim et al.
2015/0349173 A1 12/2015 Morad et al.
2016/0105144 A1 4/2016 Haynes et al.
2016/0142008 A1 5/2016 Lopez et al.
2016/0254776 A1 9/2016 Rodrigues et al.
2016/0276508 A1 9/2016 Huang et al.
2016/0359451 A1 12/2016 Mao et al.
2017/0159292 A1 6/2017 Chihlas et al.
2017/0179319 A1 6/2017 Yamashita et al.
2017/0179726 A1 6/2017 Garrity et al.
2017/0237390 A1 8/2017 Hudson et al.
2017/0331415 A1 11/2017 Koppi et al.
2018/0094438 A1 4/2018 Wu et al.
2018/0097472 A1 4/2018 Anderson et al.
2018/0115275 A1 4/2018 Flanigan et al.
2018/0254738 A1 9/2018 Yang et al.
2018/0294765 A1 10/2018 Friedrich et al.
2018/0351502 A1 12/2018 Almy et al.
2018/0367089 A1 12/2018 Stutterheim et al.
2019/0030867 A1 1/2019 Sun et al.
2019/0081436 A1 3/2019 Onodi et al.
2019/0123679 A1 4/2019 Rodrigues et al.
2019/0253022 A1 8/2019 Hardar et al.

(56) References Cited

U.S. PATENT DOCUMENTS

| | | | |
|---|---|---|---|
| 2019/0305717 | A1 | 10/2019 | Allen et al. |
| 2020/0109320 | A1 | 4/2020 | Jiang |
| 2020/0144958 | A1 | 5/2020 | Rodrigues et al. |
| 2020/0220819 | A1 | 7/2020 | Vu et al. |
| 2020/0224419 | A1 | 7/2020 | Boss et al. |
| 2020/0343397 | A1 | 10/2020 | Hem-Jensen |
| 2021/0083619 | A1 | 3/2021 | Hegedus |
| 2021/0115223 | A1 | 4/2021 | Bonekamp et al. |
| 2021/0156150 | A1 | 5/2021 | Boss et al. |
| 2021/0159353 | A1 | 5/2021 | Li et al. |
| 2021/0301536 | A1 | 9/2021 | Baggs et al. |
| 2021/0343886 | A1 | 11/2021 | Sharenko et al. |
| 2022/0060141 | A1 | 2/2022 | Felton |
| 2022/0149213 | A1 | 5/2022 | Mensink et al. |
| 2024/0291427 | A1 | 8/2024 | Perkins et al. |

FOREIGN PATENT DOCUMENTS

| | | | |
|---|---|---|---|
| CN | 202797032 | U | 3/2013 |
| CN | 217150978 | U | 8/2022 |
| DE | 1958248 | A1 | 11/1971 |
| EP | 1039361 | A1 | 9/2000 |
| EP | 1837162 | A1 | 9/2007 |
| EP | 1774372 | A1 | 7/2011 |
| EP | 2446481 | A2 | 5/2012 |
| EP | 2784241 | A1 | 10/2014 |
| EP | 3772175 | A1 | 2/2021 |
| JP | 10046767 | A | 2/1998 |
| JP | 2002-106151 | A | 4/2002 |
| JP | 2001-098703 | A | 10/2002 |
| JP | 2017-027735 | A | 2/2017 |
| JP | 2018053707 | A | 4/2018 |
| KR | 20090084060 | A | 8/2009 |
| KR | 10-1348283 | B1 | 1/2014 |
| KR | 10-2019-0000367 | A | 1/2019 |
| KR | 10-2253483 | B1 | 5/2021 |
| NL | 2026856 | B1 | 6/2022 |
| WO | 2010/151777 | A2 | 12/2010 |
| WO | 2011/049944 | A1 | 4/2011 |
| WO | 2015/133632 | A1 | 9/2015 |
| WO | 2018/000589 | A1 | 1/2018 |
| WO | 2019/201416 | A1 | 10/2019 |
| WO | 2020-159358 | A1 | 8/2020 |
| WO | 2021-247098 | A1 | 12/2021 |

OTHER PUBLICATIONS

RGS Energy, 3.5KW Powerhouse 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing; <<https://www.owenscorning.com/en-us/roofing/tools/how-roofing-underlayment-helps-protect-your-home>> retrieved Nov. 1, 2021.

* cited by examiner 220
211
221

225
221
220
223
210
215
221

215
220
216
210
200
212
211

225
220
210
215

240
240
221
221
220
211

502
510
514
504
506
512
508

METAL ROOFING SHINGLES

CROSS-REFERENCE TO RELATED APPLICATION

This application is a Section 111(a) application relating to and claiming the benefit of commonly owned, U.S. Provisional Patent Application Ser. No. 63/648,986, filed May 17, 2024, entitled "METAL ROOFING SHINGLE AND ASSOCIATED ROOFING SYSTEM AND METHOD," the contents of which is incorporated herein by reference in its entirety.

FIELD

The present invention is directed to a metal roofing shingle and an associated roofing system and method.

BACKGROUND

Known roofing systems include metal roofing shingles installed on a steep slope roof deck.

SUMMARY

The Claims, rather than the Summary, define covered embodiments of the present invention. The Summary is a high-level overview of various aspects of the invention, and introduces some concepts that are further described in the Detailed Description below. The Summary is not intended to identify key or essential features of the claimed subject matter, and also is not intended to be used in isolation to determine the scope of the claimed subject matter. Instead, the claimed subject matter should be understood by reference to appropriate portions of the Specification and drawings, as well as to each claim.

In some embodiments, the present invention provides a roofing system, comprising: a roof deck; a plurality of photovoltaic modules installed on the roof deck, wherein each of the photovoltaic modules comprises at least one solar cell; and a plurality of metal roofing shingles installed on the roof deck adjacent the plurality of photovoltaic modules, wherein the plurality of metal roofing shingles comprises at least a first metal roofing shingle and a second metal roofing shingle, wherein each of the metal roofing shingles comprises: a first layer, wherein the first layer comprises a metal material, and a second layer, wherein the second layer comprises a polymer material, wherein the second layer includes a nail zone comprising a plurality of fasteners extending therethrough, fastening the metal roofing shingle to the roof deck, wherein the second layer is between the roof deck and the first layer.

In some embodiments, the roof deck comprises a sloped roof deck.

In some embodiments, the metal material comprises steel.

In some embodiments, the polymer material comprises at least one of thermoplastic polyolefin (TPO) or ethylene tetrafluoroethylene (ETFE).

In some embodiments, the second layer further comprises an intumescent material.

In some embodiments, the intumescent material comprises expandable graphite.

In some embodiments, the second layer directly contacts the roof deck.

In some embodiments, an end of the first layer folds over an end of the second layer.

In some embodiments, the second layer of the second metal roofing shingle extends beyond an end of the first layer of the second metal roofing shingle, thereby defining a sidelap, and the second metal roofing shingle overlays the sidelap of the first metal roofing shingle.

In some embodiments, the first layer comprises a first channel and a second channel on opposite ends of the first layer, and the first channel of the first metal roofing shingle is positioned within the second channel of the second metal roofing shingle.

In some embodiments, the roofing system further comprises a plurality of fasteners, wherein the plurality of fasteners comprises at least a first fastener and a second fastener, wherein the first fastener penetrates the nail zone of the first metal roofing shingle and the roof deck, thereby installing the first metal roofing shingle on the roof deck, wherein the second fastener penetrates the nail zone of the second metal roofing shingle and the roof deck, thereby installing the second metal roofing shingle on the roof deck.

In some embodiments, the first fastener penetrates the first layer of the first metal roofing shingle.

In some embodiments, the first fastener does not penetrate the first layer of the first metal roofing shingle.

In some embodiments, the first layer of the first metal roofing shingle includes an embossed surface.

In some embodiments, each of the metal roofing shingles further comprises a third layer, wherein the third layer comprises a polymer material, wherein the first layer is between the second layer and the third layer.

In some embodiments, the third layer comprises at least one of thermoplastic polyolefin (TPO), ethylene tetrafluoroethylene (ETFE), or styrene-butadiene-styrene (SBS).

In some embodiments, the present invention includes a method, comprising: obtaining a plurality of photovoltaic modules and a plurality of metal roofing shingles, wherein the plurality of photovoltaic modules includes at least a first photovoltaic module, wherein each of the photovoltaic modules comprises at least one solar cell, wherein the plurality of metal roofing shingles comprises at least a first metal roofing shingle and a second metal roofing shingle, wherein each of the metal roofing shingles comprises: a first layer, wherein the first layer comprises a metal material, and a second layer, wherein the second layer comprises a polymer material, wherein the second layer includes a nail zone configured to receive a fastener; installing the first photovoltaic module on a roof deck; and installing the first metal roofing shingle and the second metal roofing shingle on the roof deck, adjacent to the first photovoltaic module, so that: the second layer of the first metal roofing shingle is between the roof deck and the first layer of the first metal roofing shingle, and the second layer of the second metal roofing shingle is between the roof deck and the first layer of the second metal roofing shingle.

In some embodiments, the installing the first metal roofing shingle and the second metal roofing shingle on the roof deck comprises: installing the first metal roofing shingle adjacent to a side of the first photovoltaic module, in a first row on the roof deck; and installing the second metal roofing shingle adjacent to the side of the first photovoltaic module, in a second row on the roof deck, wherein the second row is above the first row on the roof deck.

In some embodiments, the installing the first metal roofing shingle and the second metal roofing shingle on the roof deck comprises: installing the first metal roofing shingle adjacent to a side of the first photovoltaic module, in a first row on the roof deck; and installing the second metal roofing shingle adjacent to the first metal roofing shingle, in the first row on the roof deck.

In some embodiments, the installing the first metal roofing shingle and the second metal roofing shingle on the roof deck comprises: penetrating, with a first fastener, both of: the nail zone of the second layer of the first metal roofing shingle, and the roof deck, and penetrating, with a second fastener, both of: the nail zone of the second layer of the second metal roofing shingle, and the roof deck.

BRIEF DESCRIPTION OF THE FIGURES

This section refers to the drawings that form a part of this disclosure, and which illustrate some of the embodiments of structure, materials, and/or methods of the present invention described herein.

DETAILED DESCRIPTION

Figures 1A, 1B:
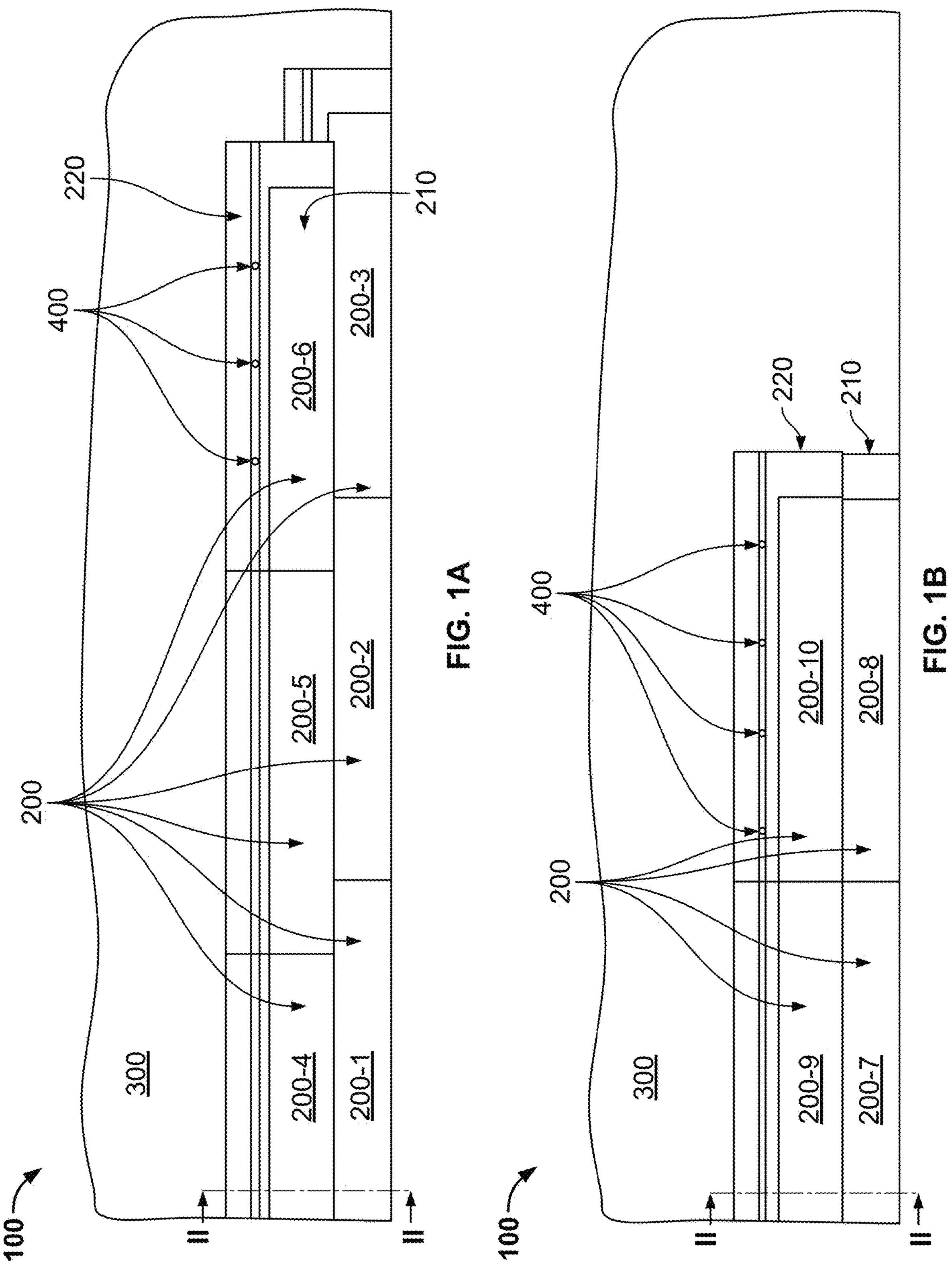
FIG. 1A is a schematic top view of a roofing system including a plurality of metal roofing shingles installed on a roof deck in a staggered configuration, in accordance with some embodiments.
FIG. 1B is a schematic top view of a roofing system including a plurality of metal roofing shingles installed on a roof deck in an array configuration, in accordance with some embodiments.

In addition to the benefits and improvements that the Specification discloses, other objects and advantages that the Specification provides will become apparent from the following description taken in conjunction with the accompanying figures. Although the description discloses and describes detailed embodiments of the present disclosure, the disclosed embodiments are merely illustrative of the disclosure that may be embodied in various forms. In addition, each of the examples given regarding the various embodiments of the disclosure are intended to be illustrative, and not restrictive.

As used herein, a “steep slope” roof or roof deck is a roof or roof deck that has a pitch of Y/X, where Y and X are in a ratio of 4:12 to 20:12, where Y corresponds to the “rise” of the roof or roof deck, and where X corresponds to the “run” of the roof or roof deck.

As used herein, a “sloped” roof or roof deck is a roof or roof deck that has a pitch greater than zero (that is, the roof or roof deck is not flat), but the pitch is less than that of a steep slope roof or roof deck.

In some embodiments, the present invention provides at least one metal roofing shingle. In some embodiments, the present invention provides a roofing system in which the at least one metal roofing shingle is installed on a roof deck. In some embodiments, the present invention provides a method, such as but not limited to a method of installing the roofing system including the at least one metal roofing shingle on the roof deck.

In some embodiments, the roof deck is a sloped roof deck. In some embodiments, the sloped roof deck is a steep slope roof deck.

In some embodiments, the roofing system includes at least one metal roofing shingle and at least one photovoltaic module installed on the roof deck. In some embodiments, the photovoltaic module includes at least one solar cell. In some embodiments, the roofing system includes a plurality (e.g., two or more) of the metal roofing shingles, and/or a plurality (e.g., two or more) of the photovoltaic modules. In some embodiments, one or more of the metal roofing shingles are installed adjacent one or more of the photovoltaic modules on the roof deck. In some embodiments, one or more of the metal roofing shingles are installed spaced apart from one or more of the photovoltaic modules on the roof deck.

In some embodiments, the metal roofing shingle includes a first layer and a second layer. In some embodiments, the first layer is an uppermost layer of the metal roofing shingle when installed on the roof deck. In some embodiments, the second layer is a bottommost later of the metal roofing shingle when installed on the roof deck. In some embodiments, the second layer is between the first layer and the roof deck, when the metal roofing shingle is installed on the roof deck.

In some embodiments, the first layer includes a metal material. In some embodiments, the metal material includes at least one of steel, stainless steel, iron, galvanized iron, copper, aluminum, lead and/or tin coated steel, lead, and/or zinc, and/or combinations thereof.

In some embodiments, the second layer includes a polymer material. In some embodiments, the polymer material includes at least one of thermoplastic polyolefin (TPO), ethylene propylene diene monomer rubber (EPDM), polyethylene terephthalate (PET), ethylene tetrafluoroethylene (ETFE), styrene-butadiene-styrene (SBS), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), polyphenylsulfone (PPSU), cyclic olefin copolymers (CPCs), and/or polyimide, and/or combinations thereof.

In some embodiments, the second layer includes an intumescent material. In some embodiments, the second layer includes the polymer and the intumescent material. In some embodiments, the intumescent material includes graphite. In some embodiments, the graphite includes expandable graphite.

In some embodiments, the first layer and the second layer are adhered to one another with an adhesive. In some embodiments, the adhesive includes at least one of an epoxy adhesive, a polyurethane adhesive, an acrylic adhesive, an ultraviolet radiation cured adhesive, a silicone-containing adhesive, a silyl modified polymer, a silane terminated polymer, natural rubber, a polyolefin polymer, a poly-alpha-olefin (APAO/APO) polymer, a polyamide polyvinyl acetate, a poly vinyl acetate, a polyvinyl alcohol, an ethylene vinyl acetate, a styrene, a styrene-isoprene-styrene (SIS) polymer, a styrene-butadiene-styrene (SBS) polymer, a styrene-ethylene/butylene-styrene (SEBS) polymer, a styrene-butadiene rubber (SBR), a polyamide, a polyester, a polyester amide, an ethylene acrylic, a butyl adhesive, and/or a butyl rubber, and/or combinations thereof. In some embodiments, the first layer and the second layer are fastened to one another with at least one fastener. In some embodiments, the first layer and the second layer are fastened to one another with a plurality of fasteners. In some embodiments, the fastener is a rivet, screw, bolt, clip, staple, or other mechanical fastener. In some embodiments, the first layer and the second layer are laminated to one another.

In some embodiments, a length (e.g., a largest dimension) of the first layer is 50 inches. In some embodiments, the length is 55 inches. In some embodiments, the length is 60 inches. In some embodiments, the length is 65 inches. In some embodiments, the length is 50 inches to 65 inches. In some embodiments, the length is 55 inches to 65 inches. In some embodiments, the length is 50 inches to 60 inches.

In some embodiments, a thickness of the second layer is 20 mil to 100 mil. In some embodiments, the thickness is 40 mil to 100 mil. In some embodiments, the thickness is 60 mil to 100 mil. In some embodiments, the thickness is 80 mil to 100 mil. In some embodiments, a thickness of the second layer is 20 mil to 80 mil. In some embodiments, the thickness is 40 mil to 80 mil. In some embodiments, the thickness is 60 mil to 80 mil. In some embodiments, a thickness of the second layer is 20 mil to 60 mil. In some embodiments, the thickness is 40 mil to 60 mil. In some embodiments, the thickness is 20 mil to 40 mil.

In some embodiments, the second layer includes a nail zone indicating where to penetrate the metal roofing shingle with one or more fasteners, to install the metal roofing shingle on the roof deck. For example, in some embodiments, the second layer includes one or more paint lines and/or one or more other markings. In some embodiments, the fasteners include at least one of a nail, screw, rivet, clip, and/or staple, and/or other mechanical fastener, extending through the nail zone. In some embodiments, the metal roofing shingle is adhered to the roof deck, in addition to or in place of being mechanically fastened to the roof deck. In some embodiments, the roofing system includes the fastener extending through the nail zone without extending through the first layer of the metal roofing shingle. In some embodiments, the roofing system includes the fastener extending through the nail zone and extending through the first layer of the metal roofing shingle. In some embodiments, the fastener extends through the roof deck.

In some embodiments, the second layer directly contacts the roof deck, such that the roofing system does not include an underlayment between the metal roofing shingle and the roof deck. In some embodiments, the roofing system includes an underlayment between the metal roofing shingle and the roof deck, and thus no layer of the metal roofing shingle directly contacts the roof deck.

In some embodiments, the second layer of the metal roofing shingle extends beyond an end of the first layer, thereby defining a sidelap. In some embodiments, the roofing system includes two metal roofing shingles installed on the roof deck, and the second metal roofing shingle overlays the sidelap of the first metal roofing shingle.

In some embodiments, a dimension of the sidelap (e.g., a length of the sidelap, which is measured in a direction parallel to the eave of the roof deck, and/or a width, which is measured in a direction parallel to the rake of the roof deck) is 2 inches. In some embodiments, the sidelap dimension is 3 inches. In some embodiments, the sidelap dimension is 4 inches. In some embodiments, the sidelap dimension is 5 inches. In some embodiments, the sidelap dimension is 6 inches. In some embodiments, the sidelap dimension is greater than 6 inches. In some embodiments, the sidelap dimension is 2 inches to 6 inches. In some embodiments, the sidelap dimension is 2 inches to 5 inches. In some embodiments, the sidelap dimension is 2 inches to 4 inches. In some embodiments, the sidelap dimension is 3 inches to 6 inches. In some embodiments, the sidelap dimension is 3 inches to 5 inches. In some embodiments, the sidelap dimension is 4 inches to 6 inches.

In some embodiments, the second layer of the second metal roofing shingle extends beyond an end of the first layer of the second metal roofing shingle, thereby defining a headlap.

In some embodiments, a dimension of the headlap (e.g., a length of the headlap, which is measured in a direction parallel to the eave of the roof deck, and/or a width, which is measured in a direction parallel to the rake of the roof deck) is 2 inches. In some embodiments, the headlap dimension is 3 inches. In some embodiments, the headlap dimension is 4 inches. In some embodiments, the headlap dimension is 5 inches. In some embodiments, the headlap dimension is 6 inches. In some embodiments, the headlap dimension is greater than 6 inches. In some embodiments, the headlap dimension is 2 inches to 6 inches. In some embodiments, the headlap dimension is 2 inches to 5 inches. In some embodiments, the headlap dimension is 2 inches to 4 inches. In some embodiments, the headlap dimension is 3 inches to 6 inches. In some embodiments, the headlap dimension is 3 inches to 5 inches. In some embodiments, the headlap dimension is 4 inches to 6 inches.

In some embodiments, the first layer of the metal roofing shingle includes a first end. In some embodiments, the first end of the first layer extends beyond the second layer. In some embodiments, the first end of the first layer is folded over the second layer. In some embodiments, the folded first end of the first layer provides a first channel. In some embodiments, the first end and/or the first channel is at a bottommost end of the metal roofing shingle when installed on the roof deck. In some embodiments, the first end contacts the roof deck.

In some embodiments, the first layer of the metal roofing shingle includes a second end. In some embodiments, the second end is opposite the first end. In some embodiments, the second end of the first layer is folded over. In some embodiments, the folded second end of the first layer provides a second channel on an opposite end of the first layer to the first channel. In some embodiments, the second end and/or the second channel is at a uppermost end of the metal roofing shingle when installed on the roof deck.

In some embodiments, in the roofing system including the metal roofing shingles in multiple rows on the roof deck, the ends of the metal roofing shingles in one row are installed or otherwise positioned within the channels of the metal roofing shingles in another row.

In some embodiments, the roofing system includes a plurality of fasteners. In some embodiments, the plurality of fasteners includes at least a first fastener and a second fastener. In some embodiments, the first fastener penetrates the nail zone of one metal roofing shingle and the roof deck, and the second fastener penetrates the nail zone of another metal roofing shingle and the roof deck, thereby installing both metal roofing shingles on the roof deck. In some embodiments, a fastener penetrates the first layer of the metal roofing shingle. In some embodiments, a fastener does not penetrate the first layer of the metal roofing shingle.

In some embodiments, the first layer of the first metal roofing shingle includes an embossed surface. In some embodiments, the embossed surface includes one or more patterns. In some embodiments, the pattern includes grain lines. In some embodiments, the grain lines are vertical grain lines. In some embodiments, the pattern includes pebble grains. In some embodiments, the first layer is painted.

In some embodiments, the metal roofing shingle further includes a third layer. In some embodiments, the third layer is an uppermost layer of the metal roofing shingle when installed on the roof deck. In some embodiments, the second layer is the bottommost later of the metal roofing shingle when installed on the roof deck. In some embodiments, the first layer is between the third layer and the second layer, when the metal roofing shingle is installed on the roof deck.

In some embodiments, the third layer includes a polymer material. In some embodiments, the polymer material includes at least one of thermoplastic polyolefin (TPO), ethylene propylene diene monomer rubber (EPDM), polyethylene terephthalate (PET), ethylene tetrafluoroethylene (ETFE), styrene-butadiene-styrene (SBS), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), polyphenylsulfone (PPSU), cyclic olefin copolymers (CPCs), and/or polyimide, and/or combinations thereof.

In some embodiments, the first layer and the third layer are adhered to one another with an adhesive. In some embodiments, the adhesive is one or more of the adhesives listed above. In some embodiments, the first layer and the third layer are laminated to one another.

In some embodiments, the method includes obtaining one or more of the photovoltaic modules, and/or one or more of the metal roofing shingles. In some embodiments, the method includes installing a first photovoltaic module on the roof deck. In some embodiments, the method includes installing a first metal roofing shingle and a second metal roofing shingle on the roof deck, adjacent to the first photovoltaic module, so that the second layer of the first metal roofing shingle is between the roof deck and the first layer of the first metal roofing shingle, and the second layer of the second metal roofing shingle is between the roof deck and the first layer of the second metal roofing shingle.

In some embodiments, the installing the first metal roofing shingle and the second metal roofing shingle on the roof deck includes installing the first metal roofing shingle adjacent to a side of the first photovoltaic module, in a first row on the roof deck, and/or installing the second metal roofing shingle adjacent to the side of the first photovoltaic module, in a second row on the roof deck, wherein the second row is above the first row on the roof deck.

In some embodiments, the installing the first metal roofing shingle and the second metal roofing shingle on the roof deck includes installing the first metal roofing shingle adjacent to a side of the first photovoltaic module, in a first row on the roof deck, and/or installing the second metal roofing shingle adjacent to the first metal roofing shingle, in the first row on the roof deck.

In some embodiments, the installing the first metal roofing shingle and the second metal roofing shingle on the roof deck includes penetrating, with a first fastener, both of the nail zone of the second layer of the first metal roofing shingle, and the roof deck, and penetrating, with a second fastener, both of the nail zone of the second layer of the second metal roofing shingle, and the roof deck.

In some embodiments, one or more of the photovoltaic modules, except as otherwise described or illustrated herein, includes a structure, composition, component, and/or function similar to those of one or more embodiments of the photovoltaic modules and photovoltaic shingles disclosed, shown, and/or described in any or all of: U.S. application Ser. No. 17/831,307, filed Jun. 2, 2022, titled "Roofing Module System," and published under U.S. Patent Application Publication No. 2022-0393637 on Dec. 8, 2022; U.S. application Ser. No. 18/169,718, filed Feb. 15, 2023, titled "Roofing Module System," and published under U.S. Patent Application Publication No. 2023-0203815 on Jun. 29, 2023; PCT International Patent Publication No. WO 2022/051593, Application No. PCT/US2021/049017, published Mar. 10, 2022, titled "Building Integrated Photovoltaic System," owned by GAF Energy LLC; and/or U.S. Pat. No. 11,251,744 to Bunea et al., issued Feb. 15, 2022, titled "Photovoltaic Shingles and Methods of Installing Same"; and the disclosures of each of which are incorporated by reference herein in their entireties, with certain different and/or additional features as described herein.

In some embodiments, the roofing system and/or method includes one or more roofing shingles, other than the metal roofing shingles and the photovoltaic modules. In some embodiments, the roofing shingles may be installed adjacent to, above, and/or below the metal roofing shingles and/or the photovoltaic modules. In some embodiments, one or more of the roofing shingles, except as otherwise described or illustrated, includes a structure, composition, component, and/or function similar to those of one or more embodiments of a non-photovoltaic module and/or another roofing material disclosed, shown, and/or described in either or both of U.S. application Ser. No. 17/831,307, filed Jun. 2, 2022, titled "Roofing Module System," and published under U.S. Patent Application Publication No. 2022-0393637 on Dec. 8, 2022; and/or U.S. application Ser. No. 18/169,718, filed Feb. 15, 2023, titled "Roofing Module System," and published under U.S. Patent Application Publication No. 2023-0203815 on Jun. 29, 2023; and/or U.S. application Ser. No. 18/352,894, filed Jul. 14, 2023, titled "Solar Roofing System with Fiber Composite Roofing Shingles," and the disclosures of each of which are incorporated by reference herein in their entireties, with certain different and/or additional features as described herein.

Figure 3:
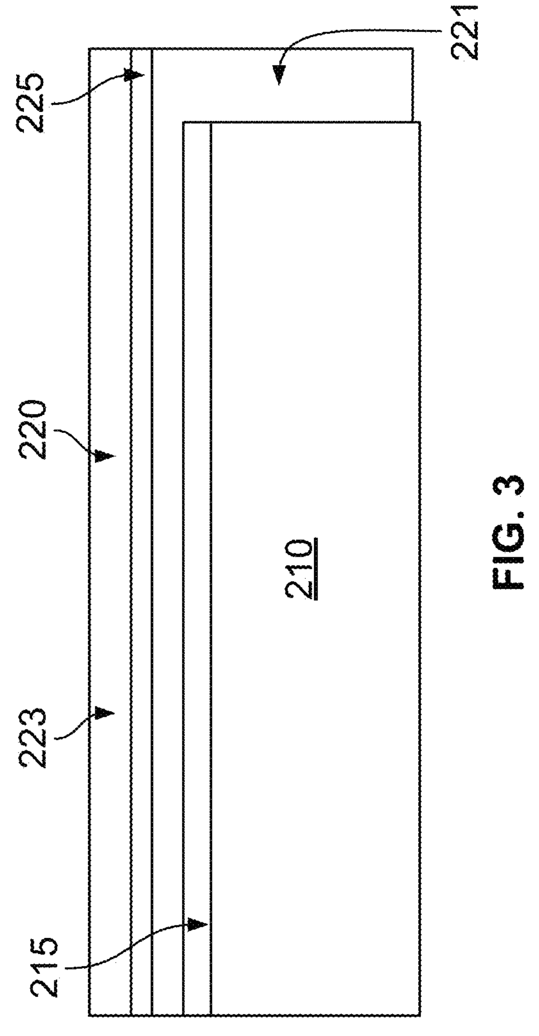
FIG. 3 is a schematic top view of one of the metal roofing shingles of FIG. 1A, in accordance with some embodiments.
Figure 2:
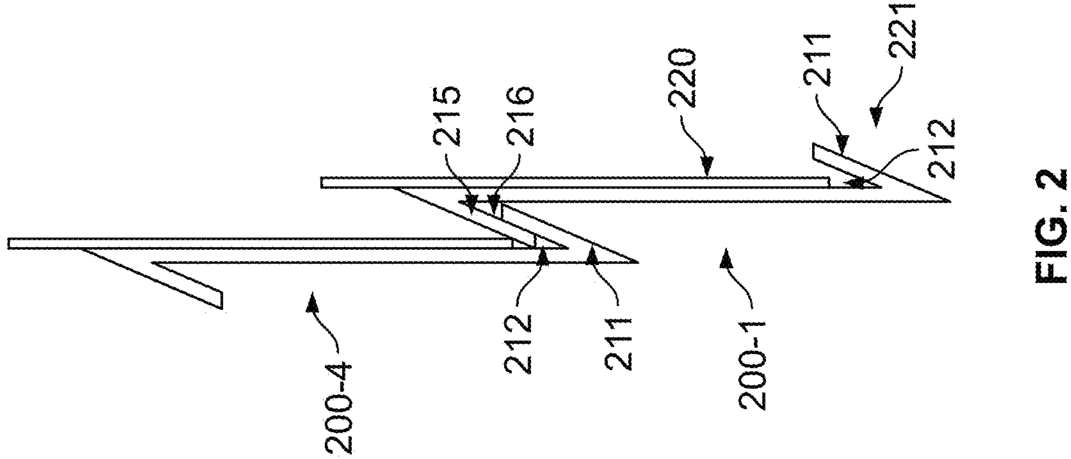
FIG. 2 is a schematic side view of some of the metal roofing shingles installed on the roof deck, taken along line II-II from FIG. 1A, in accordance with some embodiments.
Figures 4, 5:
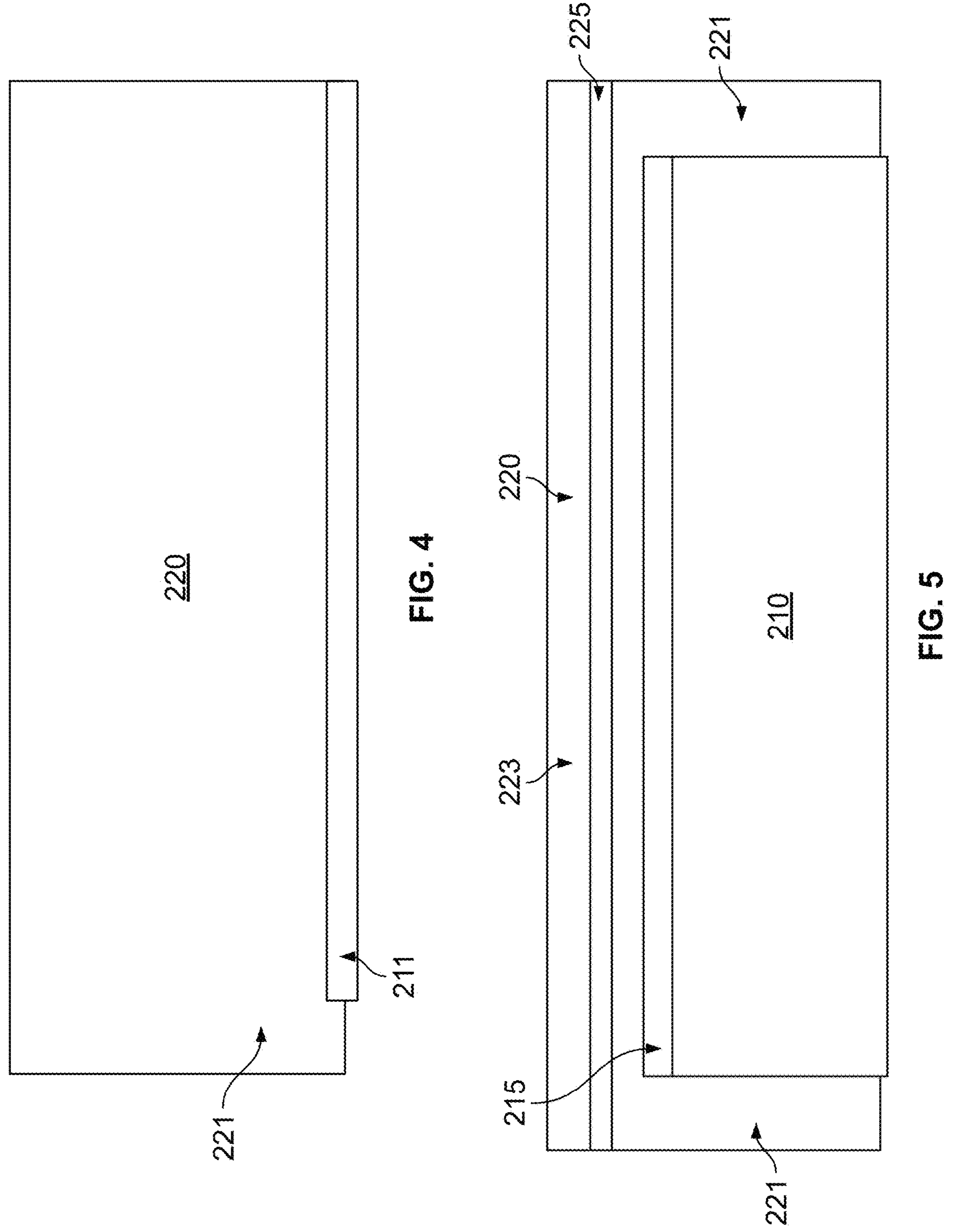
FIG. 4 is a schematic bottom view of the metal roofing shingle of FIG. 3, in accordance with some embodiments.
FIG. 5 is a schematic top view of one of the metal roofing shingles of FIG. 1A, in accordance with some embodiments.

With reference to the drawings, FIGS. 1A and 1B are schematic top views of a roofing system 100 including metal roofing shingles 200 installed on a roof deck 300, with fasteners 400 extending therethrough, in a staggered configuration and an array configuration, respectively, FIG. 2 is a schematic side view of some of the metal roofing shingles 200 installed on the roof deck 300, taken along line II-II from FIG. 1A, FIG. 3 is a schematic top view of one of the metal roofing shingles 200 of FIG. 1A, and FIG. 4 is a schematic bottom view of the metal roofing shingle 200 of FIG. 3, in accordance with some embodiments of the invention.

FIG. 1A shows an embodiment in which six (6) metal roofing shingles 200 are installed on the roof deck 300. In some embodiments, as FIG. 1A shows, the metal roofing shingles 200 are installed in a staggered or offset configuration, such that seams between adjacent shingles in a same shingle row are not aligned with seam between adjacent shingles in a shingle row that is vertically adjacent (e.g., directly above or directly below) that row. In FIG. 1A, the metal roofing shingles 200 include a first metal roofing shingle 200-1, a second metal roofing shingle 200-2, a third metal roofing shingle 200-3, a fourth metal roofing shingle 200-4, a fifth metal roofing shingle 200-5, and a sixth metal roofing shingle 200-6, installed in two rows on the roof deck 300. It is understood that in some embodiments, the roofing system 100 includes a greater number or a lesser number of metal roofing shingles 200 installed on the roof deck 300. In some embodiments, the roofing system 100 includes a greater number or a lesser number of rows of the metal roofing shingles 200 on the roof deck 300. In some embodiments, the roofing system 100 includes a greater number or lesser number of the metal roofing shingles 200 in one or more of the rows on the roof deck 300. In some embodiments, the roofing system 100 includes one or more photovoltaic modules, each including at least one solar cell, installed on the roof deck 300. In some embodiments, the photovoltaic modules are installed adjacent one or more of the metal roofing shingles 200. In some embodiments, the photovoltaic modules are installed spaced apart from one or more of the metal roofing shingles 200. In some embodiments, the roofing system 100 includes one or more roofing shingles other than the metal roofing shingles 200 and the photovoltaic modules installed on the roof deck 300. In some embodiments, the photovoltaic modules are installed in an array configuration. In some embodiments, the photovoltaic modules are installed in a staggered or offset configuration.

FIG. 1B shows an embodiment in which four (4) metal roofing shingles 200 are installed on the roof deck 300. In some embodiments, as FIG. 1B shows, the metal roofing shingles 200 are installed in an array configuration, such that seams between adjacent shingles in a same shingle row are aligned with seam between adjacent shingles in a shingle row that is vertically adjacent (e.g., directly above or directly below) that row. In FIG. 1B, the metal roofing shingles 200 include a seventh metal roofing shingle 200-7, an eighth metal roofing shingle 200-8, a ninth metal roofing shingle 200-9, and a tenth metal roofing shingle 200-10, installed in two rows on the roof deck 300.

In some embodiments, one or more of the metal roofing shingles 200 includes a first layer 210 and a second layer 220. In some embodiments, the first layer 210 and/or the second layer 220 of the metal roofing shingle 200 is as described above. Thus, in some embodiments, the first layer 210 of the metal roofing shingle 200 is a metal layer, and/or the second layer 220 of the metal roofing shingle 200 is a polymer layer.

As FIGS. 1A, 1B, 2, 3, and 4 show, in some embodiments, a first end 211 of the first layer 210 is folded over the second layer 220. In some embodiments, the first end 211 is a bottommost surface of the metal roofing shingle 200 when installed on the roof deck 300. In some embodiments, the first layer 210 includes a first channel 212 formed or otherwise provided by the folded first end 211. In some embodiments, the first layer 210 includes a second end 215 that is opposite the first end 211. In some embodiments, the second end 215 is folded over. In some embodiments, the first layer 210 includes a second channel 216 formed or otherwise provided by the folded second end 215. In some embodiments, the second channel 216 is opposite the first channel 212. In some embodiments, the second layer 220 extends beyond the first layer 210, thereby defining a sidelap 221 of the second layer 220. In some embodiments, the second layer 220 extends beyond the first layer 210, thereby defining a headlap 223 of the second layer 220.

In some embodiments, as FIG. 1A shows, the first metal roofing shingle 200-1, the second metal roofing shingle 200-2, and the third metal roofing shingle 200-3 are installed in a first row on the roof deck 300. In some embodiments, there are one or more rows that include one or more metal roofing shingles 200, below the first row that includes the first metal roofing shingle 200-1, the second metal roofing shingle 200-2, and the third metal roofing shingle 200-3. In some embodiments, there are more of the metal roofing shingles 200 installed to the left of the first metal roofing shingle 200-1.

In some embodiments, in the roofing system 100, the first metal roofing shingle 200-1 is installed prior to installation of the second metal roofing shingle 200-2, and the second metal roofing shingle 200-2 is installed prior to the installation of the third metal roofing shingle 200-3. In some embodiments, the first metal roofing shingle 200-1 and the second metal roofing shingle 200-2 are installed such that an end of the first layer 210 of the first metal roofing shingle 200-1 contacts an end of the first layer 210 of the second metal roofing shingle 200-2, the first layers 210 abutting against one another to form a butt joint between the first metal roofing shingle 200-1 and the second metal roofing shingle 200-2. In some embodiments, when the first layer 210 of the first metal roofing shingle 200-1 abuts the first layer 210 of the second metal roofing shingle 200-2, the second metal roofing shingle 200-2 overlaps the sidelap 221 of the first metal roofing shingle 200-1.

In some embodiments, the second metal roofing shingle 200-2 and the third metal roofing shingle 200-3 are installed in the first row on the roof deck 300, such that another end of the first layer 210 of the second metal roofing shingle 200-2 contacts an end of the first layer 210 of the third metal roofing shingle 200-3, the first layers 210 abutting against one another to form a butt joint between the second metal roofing shingle 200-2 and the third metal roofing shingle 200-3. In some embodiments, the third metal roofing shingle 200-3 overlap the sidelap 221 of the second metal roofing shingle 200-2.

In some embodiments, the fourth metal roofing shingle 200-4, the fifth metal roofing shingle 200-5, and the sixth metal roofing shingle 200-6 are installed in a second row on the roof deck 300, where the second row is above the first row. In some embodiments, there are one or more rows above the second row of FIG. 1A. In some embodiments, there are more of the metal roofing shingles installed to the left of the fourth metal roofing shingle 200-4. In some embodiments, the fourth metal roofing shingle 200-4 is installed prior to installation of the fifth metal roofing shingle 200-5, and the fifth metal roofing shingle 200-5 is installed prior to the installation of the sixth metal roofing shingle 200-6. In some embodiments, the fourth metal roofing shingle 200-4 and the fifth metal roofing shingle 200-5 are installed in the second row on the roof deck 300, such that an end of the first layer 210 of the fourth metal roofing shingle 200-4 contacts an end of the first layer 210 of the fifth metal roofing shingle 200-5. In some embodiments, the fifth metal roofing shingle 200-5 overlap the sidelap 221 of the fourth metal roofing shingle 200-4.

In some embodiments, the fifth metal roofing shingle 200-5 and the sixth metal roofing shingle 200-6 are installed in the second row on the roof deck 300, such that an end of the first layer 210 of the fifth metal roofing shingle 200-5 contacts an end of the first layer 210 of the sixth metal roofing shingle 200-6. In some embodiments, the sixth metal roofing shingle 200-6 overlaps the sidelap 221 of the fifth metal roofing shingle 200-5.

In some embodiments, as FIG. 1A shows, the rows are installed staggered relative to one another such that, for example, the butt joints between the metal roofing shingles 200 in one row are not aligned with the butt joints between the metal roofing shingles 200 in the row that is immediately above and/or immediately below.

In some embodiments, as FIG. 1B shows, the seventh metal roofing shingle 200-7 and the eighth metal roofing shingle 200-8 are installed in a first row on the roof deck 300. In some embodiments, there are one or more rows that include one or more metal roofing shingles 200, below the first row that includes the seventh metal roofing shingle 200-7 and the eighth metal roofing shingle 200-8. In some embodiments, there are more of the metal roofing shingles 200 installed to the left of the seventh metal roofing shingle 200-7.

In some embodiments, in the roofing system 100, the seventh metal roofing shingle 200-7 is installed prior to installation of the eighth metal roofing shingle 200-8. In some embodiments, the seventh metal roofing shingle 200-7 and the eighth metal roofing shingle 200-8 are installed such that an end of the first layer 210 of the seventh metal roofing shingle 200-7 contacts an end of the first layer 210 of the eighth metal roofing shingle 200-8, the first layers 210 abutting against one another to form a butt joint between the seventh metal roofing shingle 200-7 and the eighth metal roofing shingle 200-8. In some embodiments, when the first layer 210 of the seventh metal roofing shingle 200-7 abuts the first layer 210 of the eighth metal roofing shingle 200-8, the eighth metal roofing shingle 200-8 overlaps the sidelap 221 of the seventh metal roofing shingle 200-7.

In some embodiments, the ninth metal roofing shingle 200-9 and the tenth metal roofing shingle 200-10 are installed in a second row on the roof deck 300, where the second row is above the first row. In some embodiments, there are one or more rows above the second row of FIG. 1B. In some embodiments, there are more of the metal roofing shingles installed to the left of the ninth metal roofing shingle 200-9. In some embodiments, the ninth metal roofing shingle 200-9 is installed prior to installation of the tenth metal roofing shingle 200-105. In some embodiments, the ninth metal roofing shingle 200-9 and the tenth metal roofing shingle 200-10 are installed in the second row on the roof deck 300, such that an end of the first layer 210 of the ninth metal roofing shingle 200-9 contacts an end of the first layer 210 of the tenth metal roofing shingle 200-10. In some embodiments, the tenth metal roofing shingle 200-10 overlap the sidelap 221 of the ninth metal roofing shingle 200-9.

In some embodiments, as FIG. 1B shows, the rows are installed in an array relative to one another such that, for example, the butt joints between the metal roofing shingles 200 in one row are aligned with the butt joints between the metal roofing shingles 200 in the row that is immediately above and/or immediately below.

With reference to FIG. 2, which shows a schematic side view of the first metal roofing shingle 200-1 and the fourth metal roofing shingle 200-4 installed on the roof deck 300, taken along line II-II from FIG. 1A, the second end 215 of the first metal roofing shingle 200-1 is positioned or otherwise installed within the first channel 212 of the fourth metal roofing shingle 200-4, and the first end 211 of the fourth metal roofing shingle 200-4 is positioned or otherwise installed within the second channel 216 of the first metal roofing shingle 200-1.

With reference to FIGS. 1A and 3, in some embodiments, the metal roofing shingle 200 includes a nail zone 225 on the headlap 223, the nail zone 225 receiving the fasteners 400 that secure the metal roofing shingle 200 to the roof deck 300. In some embodiments, the fasteners 400 penetrate both the metal roofing shingle 200 and the roof deck 300.

In some embodiments, as described, one or more of the metal roofing shingles 200 are installed directly on the roof deck 300, such that there is no intervening layer such as an underlayment between the metal roofing shingles 200 and the roof deck. In some embodiments, one or more of the metal roofing shingles 200 are installed indirectly on the roof deck 300, such that there at least one intervening layer, such as but not limited to an underlayment, between the metal roofing shingles 200 and the roof deck.

FIG. 5 is a schematic top view of one of the metal roofing shingles 200 of FIG. 1A, in accordance with some embodiments of the invention. As FIG. 5 shows, in some embodiments, the metal roofing shingles 200 include two sidelaps 221—one on each end of the second layer 220, such that another sidelap 221 is opposite to the sidelap 221 shown in FIGS. 1A, 3, and 4, for example. In some embodiments, when metal roofing shingles 200 include two sidelaps 221, the metal roofing shingles 200 are installed in a same row of the roof deck 300 such that the sidelaps 221 of the metal roofing shingles 200 at least partially overlap one another. In some embodiments, the roofing system 100 includes one or more covers and/or other components that cover the overlapping sidelaps 221 of the metal roofing shingles 200.

Figures 6, 7, 8:
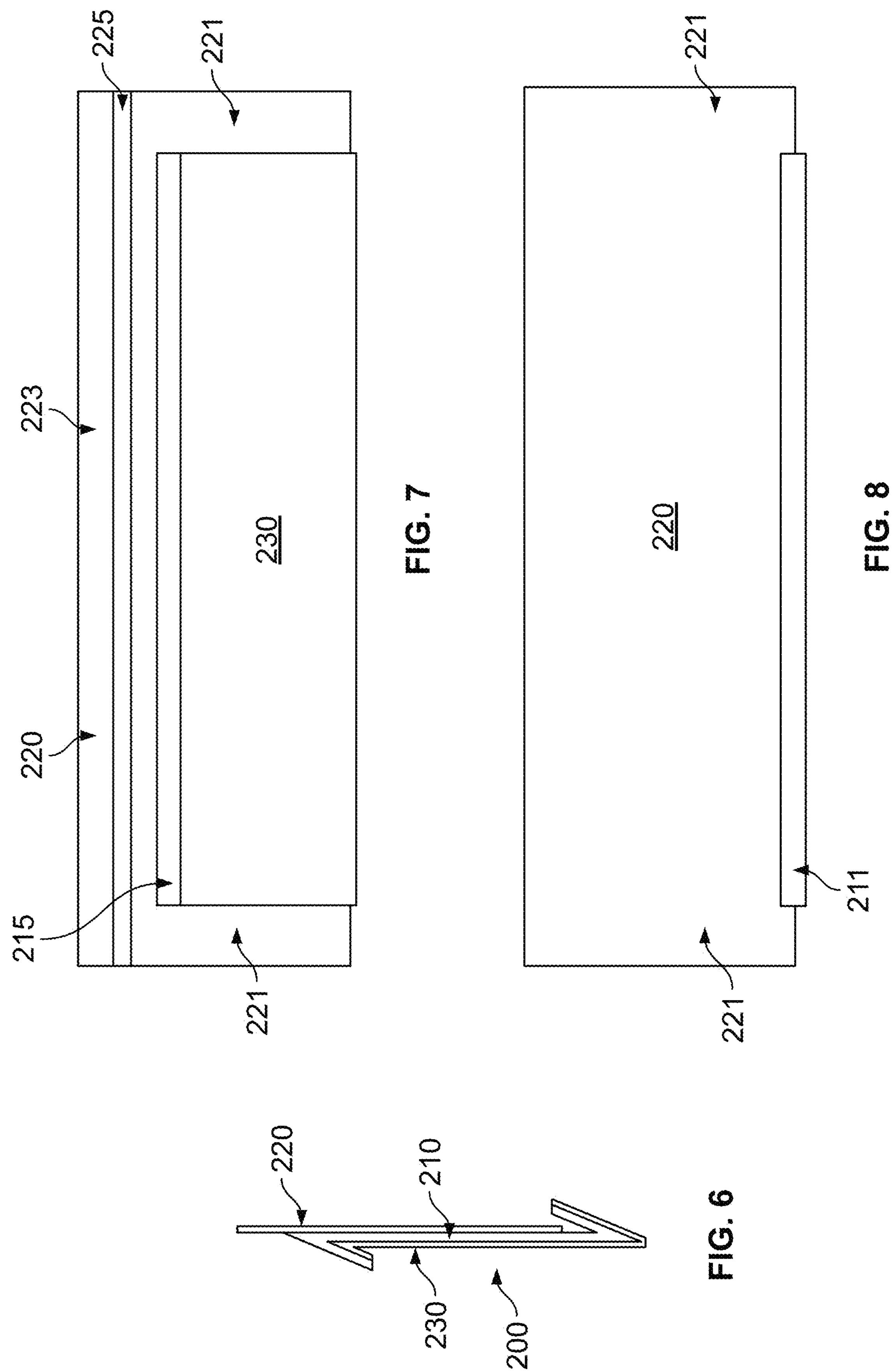
FIG. 6 is a schematic side view of one of the metal roofing shingles of FIG. 1A, in accordance with some embodiments.
FIG. 7 is a schematic top view of the metal roofing shingle of FIG. 6, in accordance with some embodiments.
FIG. 8 is a schematic bottom view of the metal roofing shingle of FIG. 6, in accordance with some embodiments.

FIG. 6 is a schematic side view of one of the metal roofing shingles 200, FIG. 7 is a schematic top view of the metal roofing shingle 200 of FIG. 6, and FIG. 8 is a schematic bottom view of the metal roofing shingle of FIG. 6, in accordance with some embodiments of the invention. As shown in FIGS. 6-8, in some embodiments, the metal roofing shingle 200 includes a third layer 230. In some embodiments, the first layer 210 is between the second layer 220 and the third layer 230. In some embodiments, the first layer 210, the second layer 220, and/or the third layer 230 of the metal roofing shingle 200 are as described above. Thus, in some embodiments, the first layer 210 of the metal roofing shingle 200 is a metal layer, the second layer 220 of the metal roofing shingle 200 is a polymer layer, and/or the third layer 230 of the metal roofing shingle 200 is a polymer layer.

In some embodiments, the metal roofing shingle 200 of FIGS. 2-4, and/or the metal roofing shingle 200 of FIG. 5, includes the third layer 230.

Figures 9, 10:
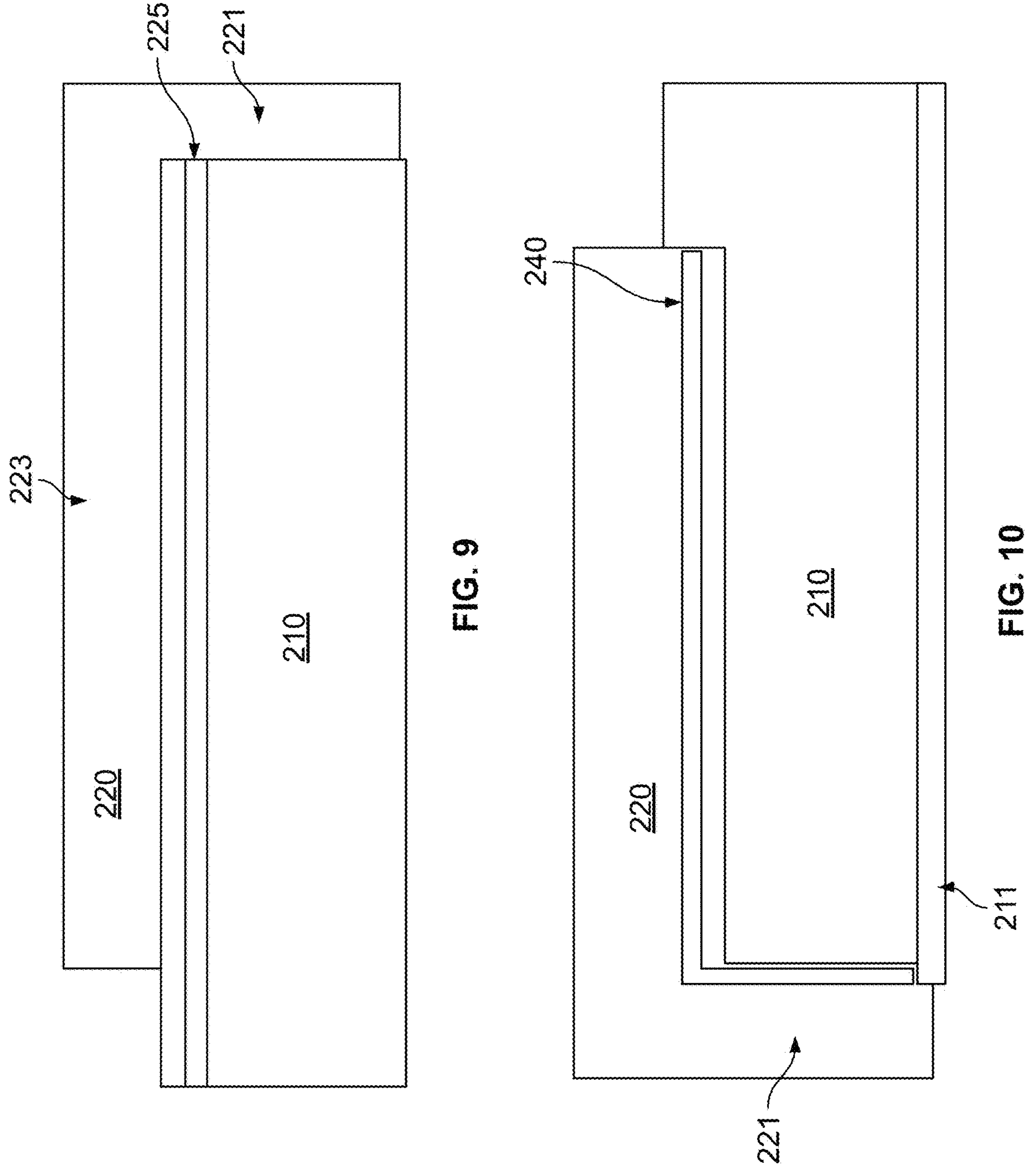
FIG. 9 is a schematic top view of one of the metal roofing shingles of FIG. 1A, in accordance with some embodiments of the invention.
FIG. 10 is a schematic bottom view of the metal roofing shingle of FIG. 9, in accordance with some embodiments of the invention.

FIG. 9 is a schematic top view of one of the metal roofing shingles 200, and FIG. 10 is a schematic bottom view of the metal roofing shingle 200 of FIG. 9, in accordance with some embodiments of the invention. As FIGS. 9 and 10 show, the metal roofing shingle 200 includes the first layer 210 and the second layer 220. In some embodiments, the first end 211 of the first layer 210 is folded over the second layer 220. In some embodiments, the second layer 220 does not cover an entire back surface of the first layer 210. In some embodiments, the second layer 220 includes one sidelap 221, and the headlap 223. In some embodiments, the nail zone 225 is on the first layer 210. In some embodiments, the second layer 220 is adhered the first layer 210 with an adhesive applied in the adhesive area 240 between the first layer 210 and the second layer 220. In some embodiments, the adhesive is applied in one or more strips of adhesive. In some embodiments, the adhesive is applied as one or more spots of adhesive. In some embodiments, an adhesive is also applied to a surface of the folded first end 211, which adheres the metal roofing shingle 200 to another metal roofing shingle and/or to the roof deck 300 when installed in the roofing system 100.

Figures 11, 12, 13:
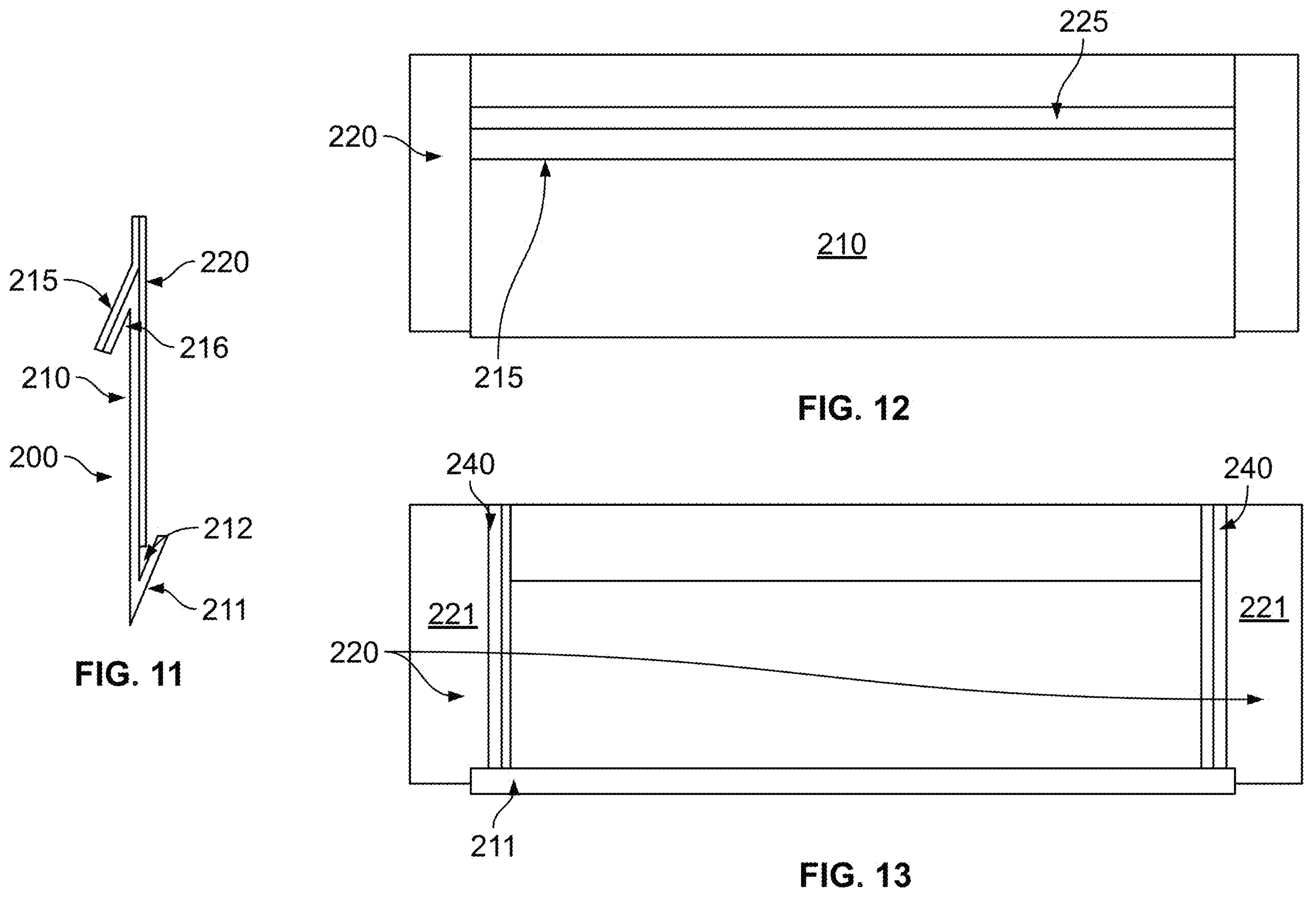
FIG. 11 is a schematic side view of one of the metal roofing shingles of FIG. 1A, in accordance with some embodiments of the invention.
FIG. 12 is a schematic top view of the metal roofing shingle of FIG. 11, in accordance with some embodiments of the invention.
FIG. 13 is a schematic bottom view of the metal roofing shingle of FIG. 11, in accordance with some embodiments of the invention.

FIG. 11 is a schematic side view of one of the metal roofing shingles 200, FIG. 12 is a schematic top view of the metal roofing shingle 200 of FIG. 11, and FIG. 13 is a schematic bottom view of the metal roofing shingle 200 of FIG. 11, in accordance with some embodiments of the invention. As shown in FIGS. 11-13, the metal roofing shingle 200 includes the first layer 210 and the second layer 220. In some embodiments, the first end 211 of the first layer 210 is folded over the second layer 220, thereby providing the first channel 212. In some embodiments, the first layer 210 includes the second end 215, which is folded, thereby providing the second channel 216. In some embodiments, as FIG. 11 shows, the first layer 210 is a sheet that is folded to form both the first channel 212 and the second channel 216.

As FIG. 13 shows, in some embodiments, the second layer 220 does not cover an entire back surface of the first layer 210. In some embodiments, the second layer 220 includes two sidelaps 221. In some embodiments, the nail zone 225 is on the first layer 210. In some embodiments, the second layer 220 is adhered the first layer 210 with an adhesive applied in the adhesive areas 240 between the first layer 210 and the second layer 220. In some embodiments, the adhesive is applied in one or more strips of adhesive. In some embodiments, the adhesive is applied as one or more spots of adhesive. In some embodiments, an adhesive is also applied to a surface of the folded first end 211, which adheres the metal roofing shingle 200 to the roof deck 300 and/or to another metal roofing shingle 200 when installed in the roofing system 100. In some embodiments, either of the sidelaps 221 is omitted from the metal roofing shingle 200.

Figures 14, 15:
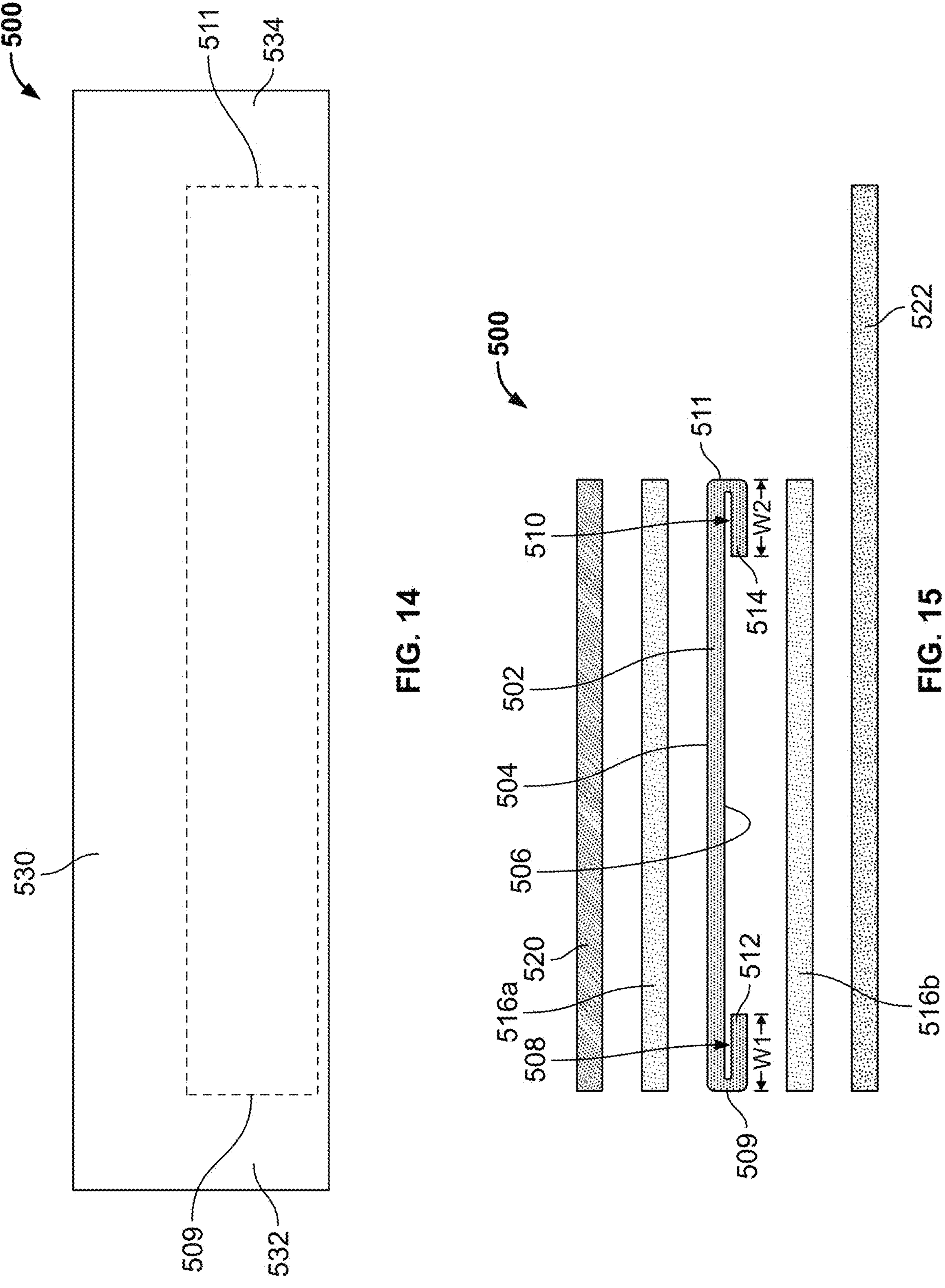
FIGS. 14 and 15 are a top plan view and a schematic side sectional view of some embodiments of a roofing shingle.

Referring to FIGS. 14 and 15, in some embodiments, a roofing shingle 500 includes a layer 502. In some embodiments, the layer 502 is composed of metal. In some embodiments, the layer 502 is composed of steel. In some embodiments, the steel has a gauge of 20 to 36. In some embodiments, the layer 502 is composed of galvanized steel. In some embodiments, the galvanized steel has a gauge of 20 to 30. In some embodiments, the layer 502 is composed of aluminum. In some embodiments, the aluminum has a gauge of 18 to 30.

In some embodiments, the layer 502 includes an upper surface 504 and a lower surface 506 opposite the upper surface 504. In some embodiments, the layer 502 includes a first hem portion 508 at a first end 509 thereof. In some embodiments, the layer 502 includes a second hem portion 510 at a second end 511 thereof.

In some embodiments, one or both of the first hem portion 508 and the second hem portion 510 is bent at the respective first end 509 and the second end 511.

Figures 16A, 16B, 16C, 16D:
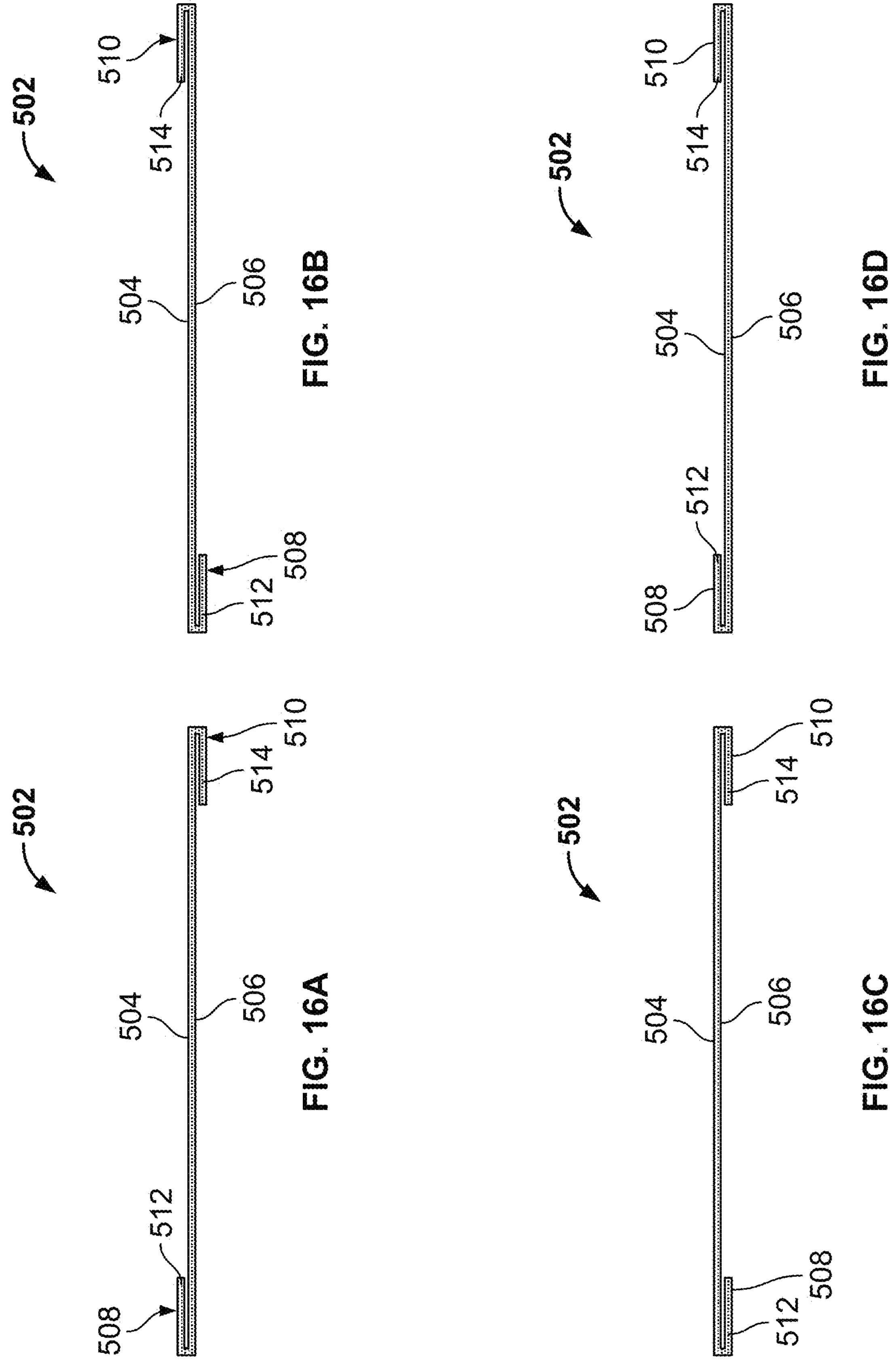
FIGS. 16A through 16D are side views of some embodiments of a layer of a roofing shingle.

Referring to FIG. 16A, in some embodiments, at least a portion 512 of the first hem portion 508 is located above the upper surface 504 of the layer 502, and at least a portion 514 of the second hem portion 510 is located below the lower surface 506 of the layer 502. In some embodiments, the portions 512, 514 are parallel or substantially parallel to the respective upper surface 504 and lower surface 506.

Referring to FIG. 16B, in some embodiments, at least a portion 512 of the first hem portion 508 is located below the lower surface 506 of the layer 502, and at least a portion 514 of the second hem portion 510 is located above the upper surface 504 of the layer 502. In some embodiments, the portions 512, 514 are parallel or substantially parallel to the respective lower surface 506 and upper surface 504.

Referring to FIG. 16C, in some embodiments, at least a portion 512 of the first hem portion 508 and at least a portion 514 of the second hem portion 510 is located below the lower surface 506 of the layer 502. In some embodiments, the portions 512, 514 are parallel or substantially parallel to the lower surface 506.

Referring to FIG. 16D, in some embodiments, at least a portion 512 of the first hem portion 508 and at least a portion 514 of the second hem portion 510 is located above the upper surface 504 of the layer 502. In some embodiments, the portions 512, 514 are parallel or substantially parallel to the upper surface 504.

In some embodiments, the first hem portion 512 has a width W1 of 5 mm to 50 mm, e.g., 5 mm, 10, mm, 20 mm, 30 mm, 40 mm, or 50 mm, including ranges between any of the foregoing values. In some embodiments, the second hem portion 514 has a width W2 of 5 mm to 50 mm, e.g., 5 mm, 10, mm, 20 mm, 30 mm, 40 mm, or 50 mm, including ranges between any of the foregoing values.

In some embodiments, the layer 502 is a colored layer. In some embodiments, the layer 502 includes a color pigment. In some embodiments, the layer 502 includes a painted layer. In some embodiments, the upper surface 504 of the layer 502 is painted.

Referring back to FIGS. 14 and 15, in some embodiments, the roofing shingle 500 includes an encapsulant. In some embodiments, the encapsulant includes a first encapsulant layer 516*a*. In some embodiments, the first encapsulant layer 516*a* is above the layer 502. In some embodiments, the encapsulant includes a second encapsulant layer 516*b*. In some embodiments, the second encapsulant layer 516*b* is below the layer 502. In some embodiments, the first encapsulant layer 516*a* and the second encapsulant layer 516*b* encapsulate the layer 502. In some embodiments, each of the first encapsulant layer 516*a* and the second encapsulant layer 516*b* has a thickness of 250 μm to 1,000 μm, e.g., 250 μm, 300 μm, 400 μm, 500 μm, 600 μm, 700 μm, 800 μm, 900 μm, 1,000 μm, including ranges between any of the foregoing values. In some embodiments, each of the first encapsulant layer 516*a* and the second encapsulant layer 516*b* is a color layer. In some embodiments, each of the first encapsulant layer 516*a* and the second encapsulant layer 516*b* includes a color pigment. In some embodiments, the first encapsulant layer 516*a* and the second encapsulant layer 516*b* have a structure, composition, function and/or features disclosed in one or more of the aforesaid patent properties incorporated by reference herein.

In some embodiments, the roofing shingle 500 includes a frontsheet 520. In some embodiments, the frontsheet 520 is above the first encapsulant layer 516*a*. In some embodiments, the frontsheet 520 is composed of a polymer. In some embodiments, the frontsheet 520 is composed of a ETFE. In some embodiments, the frontsheet 520 is composed of one or more layers. In some embodiments, the frontsheet 520 has a thickness of 10 μm to 50 μm, e.g., 10 μm, 20 μm, 30 μm, 40 μm, or 50 μm, including ranges between any of the foregoing values.

In some embodiments, the roofing shingle 500 includes a backsheet 522. In some embodiments, the backsheet 522 is below the second encapsulant layer 516*b*. In some embodiments, the backsheet 522 is composed of a polymer. In some embodiments, the backsheet 522 is composed of thermoplastic polyolefin (TPO). In some embodiments, the backsheet 522 is composed of one or more layers. In some embodiments, the backsheet 522 has a thickness of 25 mils to 150 mils, e.g., 25 mils, 50 mils, 75 mils, 100 mils, 125 mils, or 150 mils, including ranges between any of the foregoing values.

In some embodiments, the frontsheet 520 and the backsheet 522 have a structure, composition, function and/or features disclosed in one or more of the aforesaid patent properties incorporated by reference herein.

In some embodiments, the layer 502, the first encapsulant layer 516*a*, the second encapsulant layer 516*b*, the frontsheet 520, and the backsheet 522 are laminated. In some embodiments, the layer 502 is embedded in the roofing shingle 500. In some embodiments, the roofing shingle 500 includes a headlap portion 530, a first sidelap portion 532, and a second sidelap portion 534.

Variations, modifications, and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed is:

1. A roofing system, comprising:

a roof deck;

a plurality of photovoltaic modules installed on the roof deck, wherein each of the photovoltaic modules comprises at least one solar cell; and a plurality of metal roofing shingles installed on the roof deck adjacent the plurality of photovoltaic modules, wherein the plurality of metal roofing shingles comprises at least a first metal roofing shingle and a second metal roofing shingle, wherein each of the metal roofing shingles comprises:

a first layer, wherein the first layer comprises a metal material, a second layer, wherein the second layer comprises a polymer material, wherein the second layer includes a first end and a second end opposite the first end, wherein the second layer includes a nail zone extending from the first end to the second end, wherein the nail zone comprises a plurality of fasteners extending therethrough, fastening the metal roofing shingle to the roof deck, wherein the plurality of fasteners does not penetrate the first layer, wherein the second layer is the lowermost layer of the metal roofing shingle, and wherein the second layer is on the roof deck, an encapsulant including a first encapsulant layer above the first layer and a second encapsulant layer below the first layer, wherein the first encapsulant layer and the second encapsulant layer encapsulate the first layer, and a frontsheet above the first encapsulant layer, wherein the first layer, the first encapsulant layer, the second encapsulant layer, the frontsheet, and the second layer are laminated.

2. The roofing system of claim 1, wherein the roof deck comprises a sloped roof deck.

3. The roofing system of claim 1, wherein the metal material comprises steel.

4. The roofing system of claim 1, wherein the polymer material comprises at least one of thermoplastic polyolefin (TPO) or ethylene tetrafluoroethylene (ETFE).

5. The roofing system of claim 1, wherein the second layer further comprises an intumescent material.

6. The roofing system of claim 5, wherein the intumescent material comprises expandable graphite.

7. The roofing system of claim 1, wherein the second layer directly contacts the roof deck.

8. The roofing system of claim 1, wherein an end of the first layer folds over an end of the second layer.

9. The roofing system of claim 1, wherein the second layer of the second metal roofing shingle extends beyond an end of the first layer of the second metal roofing shingle, thereby defining a sidelap, wherein the second metal roofing shingle overlays the sidelap of the first metal roofing shingle.

10. The roofing system of claim 1, wherein the first layer comprises a first channel and a second channel on opposite ends of the first layer, wherein the first channel of the first metal roofing shingle is positioned within the second channel of the second metal roofing shingle.

11. The roofing system of claim 1, wherein the plurality of fasteners comprises at least a first fastener and a second fastener, wherein the first fastener penetrates the nail zone of the first metal roofing shingle and the roof deck, thereby installing the first metal roofing shingle on the roof deck, wherein the second fastener penetrates the nail zone of the second metal roofing shingle and the roof deck, thereby installing the second metal roofing shingle on the roof deck.

12. The roofing system of claim 11, wherein the first fastener does not penetrate the first layer of the first metal roofing shingle.

13. The roofing system of claim 1, wherein the first layer of the first metal roofing shingle includes an embossed surface.

14. The roofing system of claim 1, wherein the frontsheet comprises a polymer material.

15. The roofing system of claim 14, wherein the frontsheet comprises at least one of thermoplastic polyolefin (TPO), ethylene tetrafluoroethylene (ETFE), or styrene-butadiene-styrene (SBS).

16. A method, comprising:

obtaining a plurality of photovoltaic modules and a plurality of metal roofing shingles, wherein the plurality of photovoltaic modules includes at least a first photovoltaic module, wherein each of the photovoltaic modules comprises at least one solar cell, wherein the plurality of metal roofing shingles comprises at least a first metal roofing shingle and a second metal roofing shingle, wherein each of the metal roofing shingles comprises:

a first layer, wherein the first layer comprises a metal material, and a second layer, wherein the second layer comprises a polymer material, wherein the second layer includes a first end and a second end opposite the first end, wherein the second layer includes a nail zone extending from the first end to the second end, wherein the nail zone is configured to receive a plurality of fasteners, wherein the second layer is the lowermost layer of the metal roofing shingle, an encapsulant including a first encapsulant layer above the first layer and a second encapsulant layer below the first layer, wherein the first encapsulant layer and the second encapsulant layer encapsulate the first layer, and a frontsheet above the first encapsulant layer, wherein the first layer, the first encapsulant layer, the second encapsulant layer, the frontsheet, and the second layer are laminated;

installing the first photovoltaic module on a roof deck; and installing the first metal roofing shingle and the second metal roofing shingle on the roof deck with the plurality of fasteners, adjacent to the first photovoltaic module, so that:

the second layer of the first metal roofing shingle is on the roof deck and the first layer of the first metal roofing shingle, and the second layer of the second metal roofing shingle is on the roof deck and the first layer of the second metal roofing shingle, and wherein the plurality of fasteners does not penetrate the first layer.

17. The method of claim 16, wherein the installing the first metal roofing shingle and the second metal roofing shingle on the roof deck comprises:

installing the first metal roofing shingle adjacent to a side of the first photovoltaic module, in a first row on the roof deck; and installing the second metal roofing shingle adjacent to the side of the first photovoltaic module, in a second row on the roof deck, wherein the second row is above the first row on the roof deck.

18. The method of claim 16, wherein the installing the first metal roofing shingle and the second metal roofing shingle on the roof deck comprises:

installing the first metal roofing shingle adjacent to a side of the first photovoltaic module, in a first row on the roof deck; and installing the second metal roofing shingle adjacent to the first metal roofing shingle, in the first row on the roof deck.

19. The method of claim 16, wherein the installing the first metal roofing shingle and the second metal roofing shingle on the roof deck comprises:

penetrating, with a first fastener, both of:

the nail zone of the second layer of the first metal roofing shingle, and the roof deck, and penetrating, with a second fastener, both of:

the nail zone of the second layer of the second metal roofing shingle, and the roof deck.

20. The method of claim 16, wherein the frontsheet comprises at least one of thermoplastic polyolefin (TPO), ethylene tetrafluoroethylene (ETFE), or styrene-butadiene-styrene (SBS).

* * * * *